United States Patent

Weisser

[15] 3,705,340
[45] Dec. 5, 1972

[54] BUFFER SYSTEM FOR STATIC TRANSVERTERS

[72] Inventor: Wolfgang Weisser, Erlangen, Germany

[73] Assignee: Siemens Aktiengesellschaft, Berlin and Munich, Germany

[22] Filed: Oct. 15, 1971

[21] Appl. No.: 189,627

[30] Foreign Application Priority Data

Oct. 22, 1970 Germany..................P 20 51 765.1

[52] U.S. Cl............................................321/2, 321/5
[51] Int. Cl.........................H02m 5/40, H02m 5/46
[58] Field of Search..................320/1; 321/2, 27, 45

[56] References Cited

UNITED STATES PATENTS 3,295,041  12/1966  Bize........................................321/2
3,358,209  12/1967  Kanngiesser............................321/2
3,300,705  1/1967  Hunstad..................................321/2

*Primary Examiner*—William M. Shoop, Jr.
*Attorney*—Arthur E. Wilfond et al.

[57] ABSTRACT

A static transverter, of the type in which semi-conductor controlled rectifiers (thyristors) provide the commutation and in which variation of the direct current link circuit is used to control the output frequency, is provided with a buffer system connected to the direct current link circuit for keeping the transverter in operation during short power failures. Buffer capacitance is distributed in a series of capacitors respectively charged to different voltages by a separate source. These capacitors are connected in parallel to the direct current link circuit through diodes.

5 Claims, 1 Drawing Figure

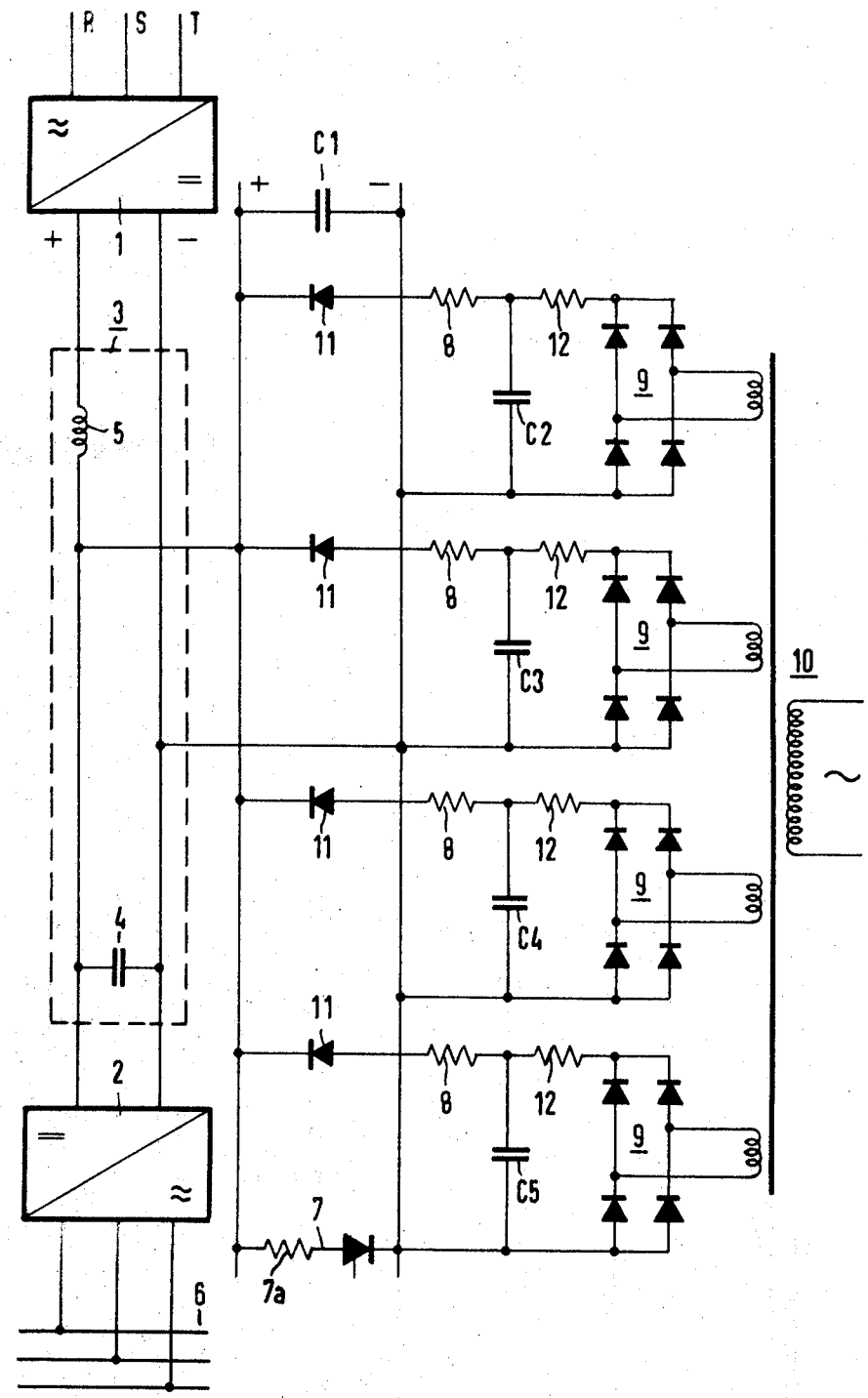

BUFFER SYSTEM FOR STATIC TRANSVERTERS

The invention concerns a capacitance buffer system for counteracting short duration power failures in the operation of transverters of the type with a variable direct current link circuit.

In the provision of power drives for machinery, especially in the textile and chemical fiber industry, static transverters with a controllable direct current link circuit are commonly used today for supplying power to the motors. (See for example "Melliand-Textilberichte," Heft 12, 1965, pages 1357 to 1363, or "-Siemens-Zeitschrift" 1967, pages 133 to 138).

In these known arrangements 3-phase alternating current is first rectified, then filtered smooth in a direct current link circuit and then converted by an inverter circuit into an alternating current of controllable frequency.

In order to maintain properly the commutation capabilities of the inverter, and thereby to prevent damaging interference with production, it must be possible in such an installation to span short-period power failures, for example up to one second, without output interruption. It is already know to provide a reserve battery for the direct current circuit which will supply to that circuit the necessary energy in the case of a power failure (cf. Melliand, loc. cit.). It is furthermore also known to provide a buffer capacitor in the direct current circuit for energy storage, e.g., to make the capacitor utilized for filtering the d.c. voltage sufficiently large (cf. Siemens-Zeitschrift, loc. cit.). This solution, however, is relatively uneconomic for the following reasons:

The power P to be drawn from the output of the transverter is, in the case of constant moment of the connected motors, proportional to the transverter frequency. The energy to be delivered from a storage buffer during a power failure lasting for the time T is accordingly P·T. When a buffer capacitor of capacitance C is used, the energy delivered is expressed by $C/2 \cdot (U_1^2 - U_2^2)$, where $U_1$ is the capacitor voltage at the beginning of buffering and $U_2$ is the capacitor voltage at the end of buffering. With regard to the voltages the condition must also be satisfied, in this case, that the ratio of voltage changes in the direct current link circuit during buffering must remain smaller than the ratio of pull-out moment to load moment of the motors.

The capacitor energy and the buffer energy thereby present vary with the square of the voltage. Since transverters, however, operate over a wide range of frequency and of voltage, for example a 1:10 range, the capacitors must have a capacitance suitable for the lowest voltages and a working voltage rating adequate for the highest voltages possible in the direct link circuit.

The problem to which this invention is directed is to provide a capacitance buffer for a system of the type described above which adapts itself automatically to the operating voltage-power ratios.

This problem is resolved according to the invention by providing the buffer capacitance at least in part in a series of capacitors of diminishing voltage rating and of increasing capacitance, which are arranged to be charged from a separating current source to different voltages, proportioned to the voltage rating, and are respectively connected across the direct current link circuit in the same polarity through diodes. In this manner it is only necessary to provide a relatively small portion of the buffer capacitance for high voltages, while the high capacitance needed in the case of low voltages can be provided by capacitors of lower voltage rating, since these are protected, in the case of higher voltages, by rectifier diodes.

It is advantageous to step the sizes of the individual capacitors in such a way that in each voltage range of the direct current link circuit the available buffer periods are of approximately the same length.

The invention is explained in further detail with reference to the single figure of the annexed drawing.

The static transverter comprises a rectifier 1, which converts the voltage of a 3-phase alternating current supply RST into a direct current voltage of controllable magnitude. This d.c. voltage is smoothed in the direct current link circuit 3 by a series inductor 5 and a filter capacitor 4 and then supplied to an inverter 2 which delivers an alternating current voltage controllable in amplitude and in frequency to a 3-phase power bus system 6. Individual driving units, not shown, e.g. synchronous motors with permanent magnets for driving spindles or the like, are connected to the power bus system 6.

Circuits of the type as described in the foregoing paragraph are known (cf. Siemens-Zeitschrift, loc. cit.).

This transverter must be provided with buffering energy in the direct current link circuit to overcome short period power failures, for example of 0.5 sec., during which the operating voltage in the direct current link circuit may lie, for example, between 50 V and 500 V.

For this purpose, in the first place, the capacitor C1 is connected across the direct current link circuit, in parallel with the supply voltage. The capacitor C1 may, for example, have a working voltage rating of 550 V.

In addition a series of capacitors C2 through C5 are also provided which are adapted to be charged by means of the transformers 10, the bridge rectifiers 9 and suitably assorted resistors 12.

These capacitors C2 and C5 are, respectively, connected in parallel with the capacitor C1 over small resistances 8 and diodes 11 in such a way that the polarity of the charge of the various capacitors is the same. The full charge voltages of the capacitors C2 through C5, however, are of magnitudes suitable for their different voltage ratings, for example for capacitor C2 400 V, for capacitor C3 300 V, for capacitor C4 150 V and for capacitor C5 75 V. The capacitance values of the capacitors C2 through C5 run in steps in inverse order to the voltage rating steps, thus for example C3 has about twice the capacitance of C2, capacitor C4 approximately 5 times C2 and capacitor C5 approximately 10 times C2, whereas C1 can be chosen with about twice the capacitance of C2. This distribution of voltage rating and capacitance is designed to provide approximately the same buffering period in each voltage range.

In addition, a short circuiting thyristor 7 (semi-conductor controlled rectifier) is connected in parallel with the capacitors so that when the system is switched off the stored energy in the capacitors and inductors in the direct current link circuit can be absorbed and prevented from building up damaging voltages. A series resistor 7a is associated with the thyristor 7.

The manner of operation of the system is as follows:

If for example a direct current potential of 350 V is present in the direct current link circuit 3 when a power failure occurs, the capacitor C1 will be charged at 350 V and likewise the capacitor C2, since its voltage cannot rise any higher. The capacitors C3 through C5 are charged to the voltages mentioned above and are blocked against the higher voltage in the direct current link circuit by the diodes 11 respectively connected to them. Buffering energy is then delivered by capacitors C1 and C2. Their voltage, and with it the voltage of operation of the direct current link circuit, thereby drops and when it falls below 300 V the blocking off of capacitor C3 ceases and the latter likewise begins to deliver energy. This process can then continue so long as a voltage diminution can be tolerated by the machinery being supplied: that is, until the pullout moment of the motors is reached.

In the manner just described a simple and economic capacitor buffering for variable link circuit transverters can be provided, by which a suffering of substantially the same length of time can be obtained over a wide frequency and voltage range.

What is claimed is:

1. Apparatus for buffering a static transverter having a variable direct current link circuit in order to maintain output during short power failures, comprising:
   a. an array of storage capacitors having different voltage ratings and having relative capacitance magnitudes in inverse order to said voltage ratings;
   b. means for charging said capacitors from a source of power other than said link circuit, said means being adapted to charge said capacitors to different voltages in the same magnitude order as their voltage ratings, and
   c. means connecting each of said capacitors across said link circuit with the same charge polarity as the operating voltage of said link circuit, said means including diodes respectively connected between one terminal of each of said capacitors and said link circuit with such diode polarity as to isolate the said capacitors respectively from the operating voltage of said link circuit so long as said operating voltage exceeds the voltage across the capacitor in question.

2. Apparatus for buffering a static transverter as defined in claim 1 in which at least one capacitor other than the capacitors of said array and having a voltage rating at least as high as that of the capacitor of said array having the highest voltage rating is connected directly across said link circuit and is adapted to function as at least part of a smoothing filter for the output voltage of said link circuit.

3. Apparatus as defined in claim 2 in which the capacitance of the respective capacitors is so provided that in each voltage range of the direct current link circuit the corresponding available buffering periods are of approximately equal length.

4. Apparatus as defined in claim 3 in which resistors of low resistance are provided in series respectively with said diodes.

5. Apparatus as defined in claim 3 in which there is connected, in parallel with the said capacitors across said link circuit, a controllable rectifier adapted to short circuit switching transients.

* * * * *